UNITED STATES PATENT OFFICE.

KARL FINCKH, OF BERLIN-TEMPELHOF, GERMANY, ASSIGNOR TO PATENT-TREU-HAND-GESELLSCHAFT FÜR-ELEKTRISCHE GLUHLAMPEN M. B. H., OF BERLIN, GERMANY.

PROCESS OF EXHAUSTING AND SEALING ELECTRICAL GLOWLAMPS AND THE LIKE.

1,410,665. Specification of Letters Patent. Patented Mar. 28, 1922.

No Drawing. Application filed June 24, 1921. Serial No. 480,189.

*To all whom it may concern:*

Be it known that I, KARL FINCKH, phil. doctor, chemist, residing at Berlin-Tempelhof, Germany, have invented certain new and useful Improvements in Processes of Exhausting and Sealing Electrical Glowlamps and the like, (for which on June 22, 1920, I filed in Germany an application for a patent,) of which the following is a specification.

U. S. Patent 1298569 issued March 25, 1919, upon the application of R. Le Rossignol relates to an apparatus for exhausting incandescent electric lamps and other kinds of glass vessels by means of a container that is in communication with the interior of lamps placed within it. The connection between the lamps and the interior of the container is established through a small, short exhaust stem or pipe joined to the lamps or vessels, the free ends of the stems or pipes being sealed by fusion inside the container after the lamps or vessels are exhausted. A small quantity of glass of a lower melting point than that of which the lamps consist may be applied to the end to be closed by melting in order to facilitate the melting process.

According to the pending patent application of R. Le Rossignol Serial No. 395028 filed July 9, 1920, the sealing of the short stems or pipes may be effected by liquefying the ends of the stems by the application of heat and removing them from the heating zone whilst they are still in a liquid state.

I have found that instead of depending upon easily fused glass as the means to be relied upon for sealing the vessels, advantageous results will be obtained by employing as the agent for accelerating and establishing the sealing of the vessels, substances which melt with glass and thus result in an easily fused glass being produced. The most noteworthy of such substances are, perhaps, alkaline salts and lead-oxides. They may be applied in any suitable way, as by being spread on in the form of a paste or of a dry powder, or by being put on in the form of a solution that is subsequently dried.

I claim:—

1. In combination with a process of exhausting and sealing electrical glowlamps or the like provided with short exhaust stems or pipes for the exhausting operation, applying to the open end of the exhaust stem a substance which lowers the melting point of the glass.

2. In combination with a process of exhausting and sealing electrical glowlamps or the like provided with short exhaust stems or pipes for the exhausting operation, applying alkaline salt to the open end of the exhaust stem for the purpose of lowering its melting point.

In testimony whereof I affix my signature in presence of two witnesses.

KARL FINCKH.

Witnesses:
HELENE VON MIDA,
WILLY WILDE.